United States Patent Office 3,561,124
Patented Feb. 9, 1971

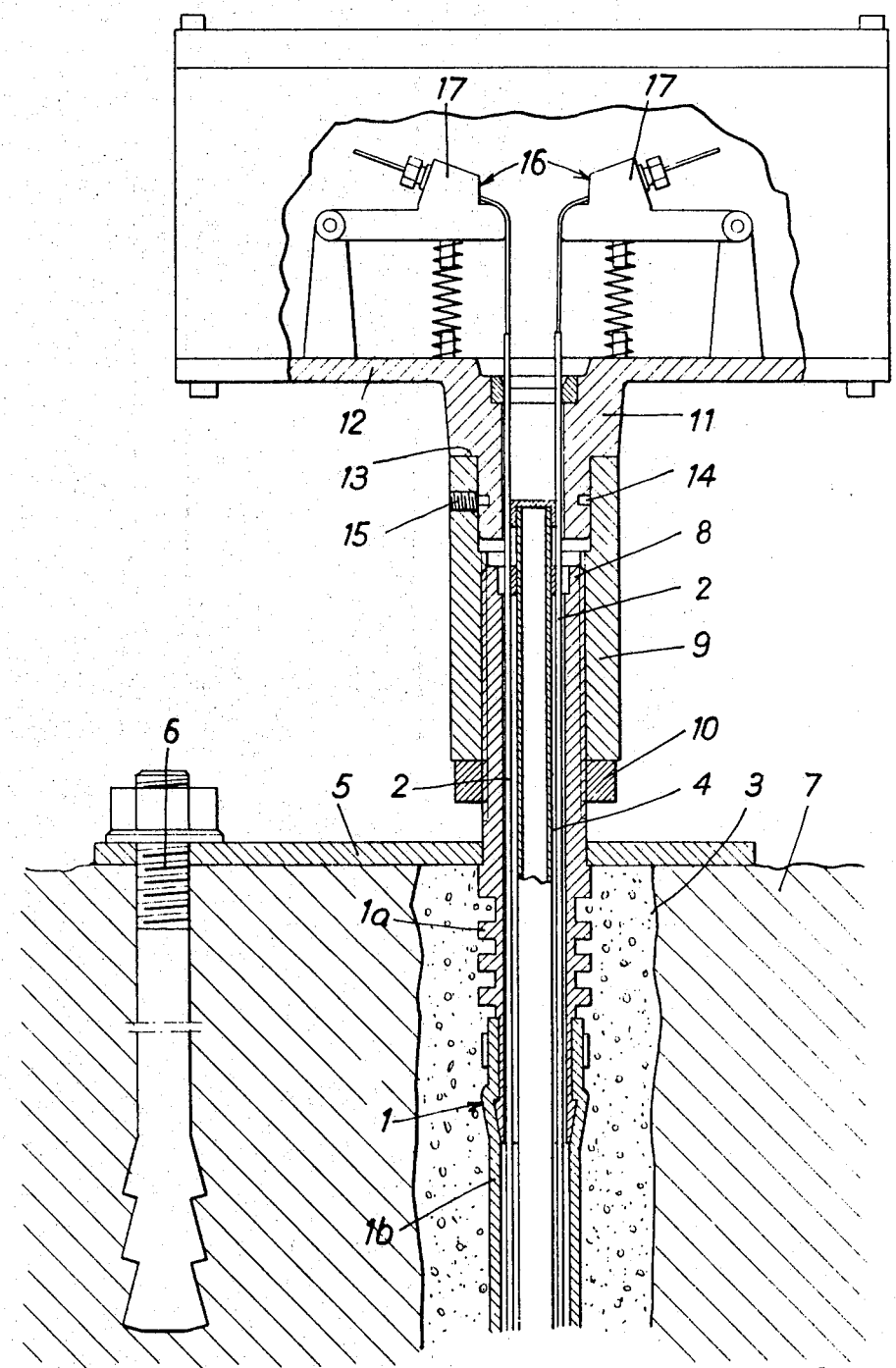

3,561,124
ATTACHMENT MEANS FOR THE MEASURING HEAD OF AN EXTENSOMETER
Bernardus Josephus Brugman, Gumligen, Switzerland, assignor to Losinger & Co. A.G., Bern, Switzerland
Filed July 12, 1968, Ser. No. 744,454
Claims priority, application Switzerland, July 27, 1967, 10,659/67
Int. Cl. E21b 49/00
U.S. Cl. 33—125                                          2 Claims

ABSTRACT OF THE DISCLOSURE

An attachment means for securing the measuring head of an extensometer at a stationary throughbored connecting piece arranged at an extension of the borehole cable which comprises a tensioning sleeve which has one end threaded onto the connecting piece and its other end rotatably supported at the measuring head.

BACKGROUND OF THE INVENTION

The present invention relates to an improved attachment means for securing the measuring head of an extensometer at a throughbored connecting piece which is stationarily arranged at an extension of the borehole cable.

In extensometers, the possibility must exist for a number of different reasons, to tighten the measuring wires, that is to vary the distance between their point of attachment at the different measuring locations within the borehole cable and the clamping locations in the measuring apparatus, particularly in order to enlarge such distance. Thus, the enlargement of this distance can be necessary, on the one hand, during setting up the extensometer to carry out its measuring operation, namely then when the measuring wires do not extend along a straight line and do not connect the measuring locations along the shortest line with the corresponding clamping locations of the measurement apparatus. However, such a further tightening can also then be necessary during the measurement operation if the distance between the clamping locations and the measurement locations shortens and the wire tension therefore slackens and possibly drops out of the most favorable measuring range.

With the known attachment techniques, the measuring head was simply threaded onto the connecting piece. As a result, if it was desired to rotate the measuring head, for the purpose of changing the distance between the clamping locations and the measuring locations, it was necessary to initially release at the clamping locations the connection of the measuring wires in the measuring head, thereafter, to rotate the measuring head, and finally to again tighten or clamp the measuring wires. Apart from the necessary expenditure of time which was associated with these various manipulations, furthermore, the exact degree of the increase in tension could not be determined since this was again dependent upon the clamping operation and, on the other hand, with the exception of coincidences, generally, the clamping locations were angularly rotated with respect to the measuring locations.

SUMMARY OF THE INVENTION

Accordingly, it is a primary objective of the present invention to provide an improved attachment arrangement of the mentioned type in which the aforementioned drawbacks can be prevented, in other words, enables a variation of the distance between the clamping locations and the measurements locations without releasing the clamping action and which furthermore allows for an exact determination of the changes in tension.

Another more specific object of the present invention relates to an improved attachment mechanism for the measuring head of an extensometer which results in improved operational reliability and accuracy of the extensometer and simplifies the use thereof.

Now, in order to implement these and still further objects of the present invention which will become more readily apparent as the description proceeds, the inventive attachment mechanism is generally manifested by the features that there is provided a tensioning or tightening sleeve having one end threaded on to the connecting piece and its other end rotatably supported at the measuring head.

BRIEF DESCRIPTION OF THE DRAWING

The invention will be better understood, and objects other than those set forth above, will become apparent, when consideration is given to the following detailed description thereof. Such description makes reference to the annexed drawing wherein the single figure shows in partial sectional view an exemplary embodiment of the inventive attachment mechanism for the measuring head of an extensometer.

DESCRIPTION OF THE PREFERRED EMBODIMENT

Describing now the single figure, it is to be understood that reference numeral 1 designates the borehole cable consisting of the anchoring members 1a and the jacket sleeves or tubes 1b (in the drawing only one of each have been conveniently shown). Within the borehole cable 1, a number of measuring wires 2 (in the drawing only two such wires are visible), lead in a manner not further illustrated, but well known to the art, to the non-depicted measuring location within the borehole 3. An inner tube member 4 extends coaxially with respect to the borehole cable 1 and is enclosed by the latter. This inner tube member 4 on the one hand serves as the internal support for non-illustrated measuring cable guide means and, on the other hand, is used for introducing the mass of injectable material by means of which the corresponding anchoring members are connected at the measuring locations with the inner wall of the borehole 3. Further details of the structure of the borehole measuring cable unit and its components can be ascertained by referring to the commonly assigned, copending United States patent application, Ser. No. 744,452, filed July 12, 1968, and entitled "Borehole Measuring Cable for Extensometers" now United States Pat. 3,489,000, granted Jan. 13, 1970.

The uppermost anchoring member 1a is welded or otherwise connected with the base plate 5 which, in turn, is secured by a number of fastening screws 6 or the like (only one being visible in the drawing) to the ground or rock. The anchoring member 1a possesses a connecting piece or flange 8 as an extrusion of the borehole cable and which protrudes above the base plate 5. On the outside of this connecting piece or flange 8 there is threaded the tensioning or tightening sleeve member 9 which is secured in position by a lock nut member 1. The upper end of the tensioning sleeve 9 serves as a support for a downwardly depending plug or journal 11 of the measuring head 12, the edges of the sleeve member 9 bearing against appropriate shoulder means 13 of the measuring head 12, as shown. This plug or journal 11 is provided with an annular or ring-shaped groove means 14 into which extends the bolt of a lateral adjustment screw 15 of the tensioning sleeve 9. By threading in the adjustment screw 15, there is fixed the position of the measuring head with respect to the tensioning sleeve 9, while permitting a mutual rotation, whereas upon tightening of the adjustment screw 15, the tensioning sleeve 9 and the measuring head 12 are rigidly connected for rotation with one another. In the measuring head 12, there is housed the schematically illustrated measuring apparatus 16, with the clamping locations for the measuring wires being designated by reference numeral 17.

Now, if the distance between the clamping locations 17 and the non-illustrated measuring locations should be changed, for instance, increased, then it is sufficient to appropriately rotate the tensioning sleeve 9 whereby the measuring head 12 will be pushed toward the outside, in other words, towards the top, by the action of the upper edges of this tensioning sleeve, without such measuring head, with the adjustment screw 15 loosened, following the corresponding rotational movement of the tensioning sleeve 9.

Furthermore, it is possible to provide a vernier scale at the edge of the tensioning sleeve and the jacket of the connecting piece or flange, by means of which there can be determined the exact change in length and therefore also the change in tension.

In this manner, it is possible to undertake a change in the distance or spacing between the clamping locations and the measuring locations without having to release the measuring wires for this purpose from the measuring apparatus.

It should be apparent from the foregoing detailed description that the objects set forth at the outset to the specification have been successfully achieved.

Accordingly, what is claimed is:

1. A borehole extensometer, comprising a measuring head, a hollow borehole cable and a stationary throughbored connecting piece arranged at the extension of said borehole cable, measuring wires extending through said hollow borehole cable, means provided at said measuring head for fixedly releasably clamping thereat said measuring wires, attachment means for securing said measuring head of said extensometer at said stationary throughbored connecting piece, said attachment means comprising tensioning sleeve means having one end secured to said connecting piece and its other end rotatably supported at said measuring head, and means for selectively fixedly connecting said tensioning sleeve means with said measuring head, said fixedly connecting means including annular groove means provided for said measuring head and fastening means insertable through said tensioning sleeve into engagement with said annular groove means, said fastening means cooperating with said annular groove such that when said fastening means is in an untightened state said tensioning sleeve member is rotatable relative to said connecting piece to selectively elevationally position said measuring head without necessitating rotation thereof which otherwise might cause undesired twisting of said clamped measuring wires.

2. The borehole extensometer as defined in claim 1, wherein said measuring head includes a downwardly depending portion provided with said annular groove means, said connecting piece having a threaded portion at the region of its upper end, said tensioning sleeve having threading cooperating with said threaded portion of said connecting piece, and said downwardly depending portion of said measuring head and said upper end region of said connecting piece being arranged in substantially coaxial confronting relationship, with the axial spacing therebetween being adjustable through manipulation of said attachment means.

References Cited

UNITED STATES PATENTS

| 477,960 | 6/1892 | Price | 33—170 |
|---|---|---|---|
| 3,380,167 | 4/1968 | Abel, Jr., et al. | 33—125 |

JERRY W. MYRACLE, Primary Examiner

U.S. Cl. X.R.

73—88